United States Patent
Ou et al.

(10) Patent No.: US 10,349,312 B2
(45) Date of Patent: Jul. 9, 2019

(54) METHOD FOR HANDOVER BETWEEN DISTRIBUTED APS, CENTRAL AP, AND DISTRIBUTED AP

(71) Applicant: Huawei Technologies Co., Ltd., Shenzhen (CN)

(72) Inventors: Liyun Ou, Nanjing (CN); Yungui Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 15/631,333

(22) Filed: Jun. 23, 2017

(65) Prior Publication Data

US 2017/0374595 A1 Dec. 28, 2017

(30) Foreign Application Priority Data

Jun. 25, 2016 (CN) .......................... 2016 1 0475049

(51) Int. Cl.
  *H04W 36/00* (2009.01)
  *H04W 28/02* (2009.01)
  (Continued)

(52) U.S. Cl.
  CPC ......... *H04W 36/0011* (2013.01); *H04L 47/34* (2013.01); *H04W 28/0226* (2013.01);
  (Continued)

(58) Field of Classification Search
  CPC ......... H04W 36/0011; H04W 36/0016; H04W 36/023; H04W 28/0226; H04W 28/0273;
  (Continued)

(56) References Cited

U.S. PATENT DOCUMENTS

| | | | |
|---|---|---|---|
| 2007/0263559 A1* | 11/2007 | Gossain | H04L 45/16 370/328 |
| 2008/0279181 A1* | 11/2008 | Shake | H04L 1/08 370/389 |

(Continued)

FOREIGN PATENT DOCUMENTS

WO 2016034254 A1 3/2016

OTHER PUBLICATIONS

"Part 11: Wireless LAN Medium Access Control (MAC) and Physical Layer (PHY) Specifications, Amendment 2: Fast Basic Service Set (BSS) Transition," IEEE Computer Society, IEEE Std 802.11r, Jul. 15, 2008, 126 pages.

(Continued)

*Primary Examiner* — Joshua Kading
(74) *Attorney, Agent, or Firm* — Conley Rose, P.C.

(57) ABSTRACT

A method for a handover between distributed access points is disclosed, including receiving, by a central AP, an Ethernet frame; adding, by the central AP, a sequence number to the frame according to an address of a wireless terminal; sending, by the central AP to an AP 1, the frame to which the sequence number is added, and storing the frame to which the sequence number is added in a historical frame set of the wireless terminal; and sending, by the central AP, a frame in the historical frame set of the wireless terminal to an AP 2 when the wireless terminal is handed over from the AP 1 to the AP 2. If the wireless terminal moves fast, the central AP can send the frame in the historical frame set to the wireless terminal using the AP 2, so that a downlink packet loss is reduced.

10 Claims, 6 Drawing Sheets

(51) Int. Cl.
*H04L 12/801* (2013.01)
*H04W 28/04* (2009.01)
*H04W 36/02* (2009.01)
*H04W 84/02* (2009.01)
*H04W 84/12* (2009.01)

(52) U.S. Cl.
CPC ....... *H04W 28/0273* (2013.01); *H04W 28/04* (2013.01); *H04W 36/0016* (2013.01); *H04W 36/023* (2013.01); *H04W 84/02* (2013.01); *H04W 84/12* (2013.01)

(58) Field of Classification Search
CPC ..... H04W 28/04; H04W 84/02; H04W 84/12; H04L 47/34
See application file for complete search history.

(56) References Cited

U.S. PATENT DOCUMENTS

| | | | | |
|---|---|---|---|---|
| 2009/0168723 | A1* | 7/2009 | Meylan | H04L 1/1841 370/331 |
| 2009/0274173 | A1* | 11/2009 | Wentink | H04W 28/06 370/474 |
| 2009/0296655 | A1* | 12/2009 | Tamura | H04L 47/34 370/331 |
| 2010/0039996 | A1* | 2/2010 | Ohta | H04L 47/10 370/328 |
| 2014/0105060 | A1 | 4/2014 | Baillargeon | |
| 2017/0034847 | A1* | 2/2017 | He | H04W 74/06 |
| 2017/0201603 | A1* | 7/2017 | Uchino | H04W 36/02 |
| 2018/0249390 | A1* | 8/2018 | Agiwal | H04W 24/10 |

OTHER PUBLICATIONS

Bernaschi, M., et al., "OpenCAPWAP: An open source CAPWAP implementation for the management and configuration of WiFi hot-spots," XP025846109, Computer Networks, 2008, 14 pages.
Yang, L., Ed., et al.,"Architecture Taxonomy for Control and Provisioning of Wireless Access Points (CAPWAP)," XP015016305, draft-ietf-capwap-arch-03, Jun. 29, 2004, 96 pages.
Sarikaya, B., et al., "CAPWAP Handover Protocol (CAPWAPHP)," XP015045204, draft-sarikaya-capwap-capwaphp-02, Jun. 23, 2006, 36 pages.
Shooshtari, A., "Optimizing handover performance in LTE networks containing relays," XP055404288, School of Electrical Engineering, Apr. 29, 2011, 88 pages.
Research in Motion UK Limited "Joint PDCP protocols on Uu and Un interfaces to improve type-I relay handover," XP050351968, R2-093735, Jun. 29-Jul. 3, 2009, 10 pages.
Foreign Communication From a Counterpart Application, European Application No. 17177628.9, Extended European Search Report dated Sep. 15, 2017, 13 pages.
Foreign Communication From a Counterpart Application, European Application No. 17177628.9, European Office Action dated Oct. 11, 2018, 6 pages.

* cited by examiner

METHOD FOR HANDOVER BETWEEN DISTRIBUTED APS, CENTRAL AP, AND DISTRIBUTED AP

CROSS REFERENCE TO RELATED APPLICATION

This application claims priority to Chinese Patent Application No. 201610475049.1, filed on Jun. 25, 2016, which is hereby incorporated by reference in its entirety.

TECHNICAL FIELD

This application relates to the field of communications technologies, and in particular, to a method for a handover between distributed access points (AP), a central AP, and a distributed AP.

BACKGROUND

When a wireless terminal on a wireless local area network (WLAN) moves, the wireless terminal is handed over between AP. Handover means that when the wireless terminal moves from a coverage area of an AP to a coverage area of another AP, the wireless terminal connects to the latter AP instead of connecting to the former AP. In a handover process of the wireless terminal, a central AP may immediately send a newly received packet that is to be sent to the wireless terminal to the latter AP instead of the former AP for forwarding. However, in this case, the former AP may still have some buffered packets that have not been sent to the wireless terminal, causing a downlink packet loss. Herein, a packet sent by a distributed AP to the wireless terminal is referred to as a downlink packet, and a packet sent by the wireless terminal to the distributed AP is referred to as an uplink packet. If the lost downlink packet is a voice service packet, a short-time voice loss occurs. If the lost downlink packet is a video service packet, short-time frame freezing and erratic display occur. This degrades user experience.

SUMMARY

This application provides an improved method for a handover between distributed access points.

A first aspect provides a method a handover between different distributed APs in a same mobile domain (that is, in which a same central AP implements control). The central AP receives an Ethernet frame, where a destination address of the Ethernet frame is an address of a wireless terminal. The central AP adds a sequence number to the Ether net frame according to the address of the wireless terminal, where the sequence number is different from a sequence number of a historical frame of the wireless terminal, and the historical frame of the wireless terminal is a frame that has been sent by the central AP to the wireless terminal. The central AP sends, to a first distributed AP, the Ether net frame to which the sequence number is added, where the first distributed AP is a distributed AP serving the wireless terminal among multiple distributed APs, and stores the Ether net frame to which the sequence number is added in a historical frame set of the wireless terminal; and the central AP sends a frame in the historical frame set of the wireless terminal to a second distributed AP when the wireless terminal is handed over from the first distributed AP to the second distributed AP.

In this technical solution, if the wireless terminal moves, the central AP can send a frame in a historical frame set to the wireless terminal using the second distributed AP, to replace a frame that is buffered in the first distributed AP and has not been sent to the wireless terminal, so that a downlink packet loss during a handover of the wireless terminal between the first distributed AP and the second distributed AP is reduced.

In a first possible implementation manner of the first aspect, when the historical frame set is greater than a preset threshold, the central AP deletes one or more frames from the historical frame set in storage order, and the historical frame set after the deletion is less than or equal to the preset threshold.

In this technical solution, the central AP stores only an Ether net frame below a preset threshold for the wireless terminal, so that storage space of the central AP is saved while a downlink packet loss during a handover of the wireless terminal between the first distributed AP and the second distributed AP is reduced.

With reference to the first aspect or the first possible implementation manner of the first aspect, in a second possible implementation manner, the sequence number is added to a virtual local area network identifier (VLAN ID) field of the Ether net frame.

With reference to the first aspect or the first or the second possible implementation manner of the first aspect, in a third possible implementation manner, the central AP encapsulates the Ether net frame into a Control And Provisions of Wireless Access Points (CAPWAP) packet, and adds the sequence number to a customized field of a CAPWAP header of the CAPWAP packet.

With reference to any one of the first aspect or the first to the third possible implementation manners of the first aspect, in a fourth possible implementation manner, the central AP may determine a sequence number record of the wireless terminal according to the address of the wireless terminal, and add the sequence number to the Ether net frame according to the sequence number record.

With reference to the fourth possible implementation manner of the first aspect, in a fifth possible implementation manner, the central AP may further receive a sequence number change message sent by the first distributed AP, where the sequence number change message includes the address of the wireless terminal and a sequence number change value; and the central AP determines the sequence number record of the wireless terminal according to the address of the wireless terminal, and modifies the sequence number record of the wireless terminal according to the sequence number change value.

In this technical solution, the first distributed AP combines at least two Ether net frames sent by the central AP into one data frame, and sends the data frame to the wireless terminal, where sequence numbers carried in the Ether net frames are different, a sequence number recorded by the central AP is a maximum sequence number in historical frames, the data frame obtained after the combination carries one sequence number, and the sequence number is a minimum sequence number in the at least two Ether net frames. To ensure as much as possible that sequence numbers of data frames received by the wireless terminal are consecutive, the central AP is notified of a sequence number change value using a sequence number change message, and the central AP modifies a sequence number record according to the sequence number change value, and adds a correct sequence number to an Ether net frame received subsequently.

A second aspect provides another method for a handover between different distributed APs in a same mobile domain. A distributed AP receives a first Ether net frame sent by a central AP, where a destination address of the first Ether net frame is an address of a wireless terminal, and the first Ether net frame carries a first sequence number; the distributed AP converts the first Ether net frame into a data frame, where a sequence number of the data frame is a second sequence number generated based on the first sequence number; and the distributed AP sends the data frame to the wireless terminal.

In a first possible implementation manner of the second aspect, the distributed AP combines at least two Ether net frames sent by the central AP into the data frame, where the at least two Ether net frames include the first Ether net frame, and a destination address of each Ether net frame of the at least two Ether net frames is the address of the wireless terminal.

With reference to the first possible implementation manner of the second aspect, in a second possible implementation manner, the at least two Ether net frames further include a second Ether net frame, the second Ether net frame carries a third sequence number, the first Ether net frame is an Ether net frame with a minimum sequence number in the at least two Ether net frames, and the second Ether net frame is an Ether net frame with a maximum sequence number in the at least two Ether net frames. The distributed AP may further send a sequence number change message to the central AP, where the sequence number change message includes the address of the wireless terminal and a sequence number change value based on the first sequence number and the third sequence number.

A third aspect provides a central AP. The central AP includes a processor, a memory, and a network interface. The processor is connected to the memory and the network interface. For example, the processor may be connected to the memory and the network interface using a bus. The network interface includes one or more Ether net interfaces. If the network interface includes one Ether net interface, the central AP may be connected to a piece of switching equipment using the Ether net interface. One or more network interfaces of the switching equipment are connected to a distributed AP in a wired manner, and are configured to send/receive messages involved in the foregoing methods to/from the distributed AP. Remaining network interfaces of the switching equipment are connected to another network device in a wired manner, and are configured to receive an Ether net frame sent by the another network device. If the network interface includes multiple Ether net interfaces, one or more Ether net interfaces of the multiple Ether net interfaces are connected to the distributed AP in a wired manner, and are configured to send/receive messages involved in the foregoing methods to/from the distributed AP. Remaining Ether net interfaces of the multiple Ether net interfaces are connected to another network device in a wired manner, and are configured to receive an Ether net frame sent by the another network device. The memory is configured to store a handover condition, a sequence number record of a wireless terminal, or a historical frame of a wireless terminal. The processor is configured to perform some or all processes in the first aspect.

A fourth aspect provides another central AP. The central AP includes a processing module, a sending module, and a receiving module. The central AP implements a part of the method or the entire method in the first aspect using the foregoing modules.

A fifth aspect provides a computer storage medium, where the computer storage medium stores a program, and the program performs some or all steps in the first aspect.

A sixth aspect provides a distributed AP. The distributed AP includes a processor, a memory, and a network interface. The network interface includes a radio interface. Optionally, the network interface may also include a wired interface. The distributed AP may be connected to a central AP in a wired manner using the wired interface, and send/receive messages involved in the foregoing methods to/from the central AP. Alternatively, the distributed AP may be connected to the central AP using the radio interface, and send/receive messages involved in the foregoing methods to/from the central AP. The distributed AP performs wireless communication with a wireless terminal using the radio interface. The processor is configured to perform some or all processes in the second aspect.

A seventh aspect provides another distributed AP. The distributed AP includes a processing module, a sending module, and a receiving module. The distributed AP implements a part of the method or the entire method in the second aspect using the foregoing modules.

An eighth aspect provides a computer storage medium, where the computer storage medium stores a program, and the program performs some or all steps in the second aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
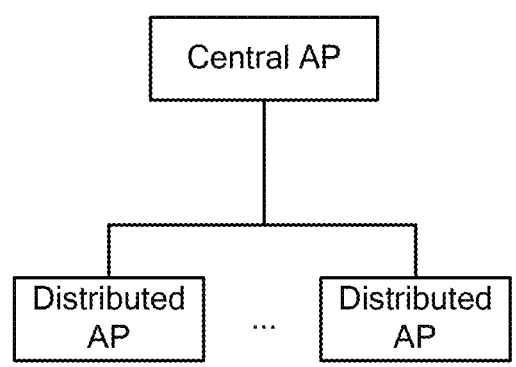
FIG. 1 is a schematic diagram of a structure of a central-distributed architecture according to an embodiment of the present disclosure.

As shown in FIG. 1, a central-distributed architecture includes a central AP and at least two distributed APs. The distributed AP is an AP with a radio frequency function. The central AP may be an AP with a radio frequency function or a network device without a radio frequency function. For more detailed functions of the central AP and the distributed AP, refer to the following description.

The central AP has functions of a conventional AP (except a radio frequency part), and additionally has some functions of a wireless controller, such as wireless terminal association control and an intra-central AP handover. The intra-central AP handover function refers to a function that allows a wireless terminal to be handed over between different distributed APs controlled by a central AP. The central AP further has a function of managing the distributed AP. In addition to the foregoing functions, the central AP may have a broadband service-related function and a service forwarding-related function of the conventional AP, such as quality of service (QoS) and an access control list (ACL). The wireless controller may be an access controller (AC) specified in the CAPWAP protocol.

The central AP may further have functions of a gateway. The central AP may further have functions such as network access control (NAC) and a Dynamic Host Configuration Protocol (DHCP) server.

The distributed AP is a radio frequency module separated from the conventional AP. The distributed AP is responsible for processing an air interface packet of a WLAN, and communicating with the central AP using a wired network (for example, the Ether net). The central AP and the distributed AP may communicate with each other directly or using a CAPWAP channel.

The CAPWAP protocol provides a control channel and a data channel between a wireless termination point (WTP) and an AC. In this embodiment of the present disclosure, when the distributed AP and the central AP communicate with each other using the CAPWAP control channel and data channel, the central AP serves as the AC specified in a CAPWAP control protocol, and the distributed AP serves as the WTP specified in the CAPWAP control protocol.

This embodiment of the present disclosure is applicable to a scenario in which a wireless terminal is handed over between different distributed APs controlled by a central AP. The wireless terminal is any device with a function of a WLAN station (STA), for example, a cellphone, a smartphone, a computer, a tablet computer, a personal digital assistant (PDA), a mobile Internet device (MID), a wearable device, and an e-book reader.

Figure 2A:
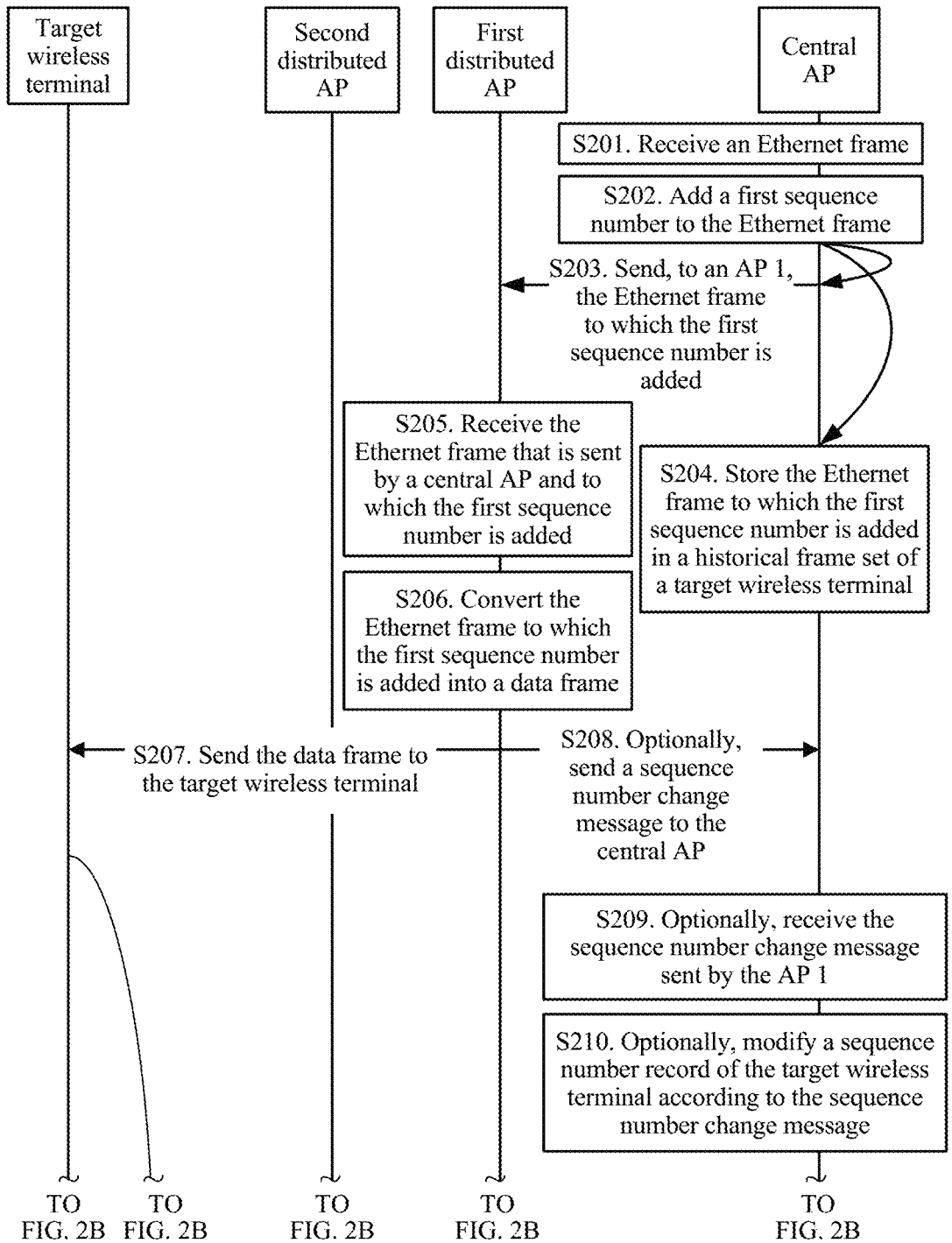
FIG. 2A to FIG. 2B are a schematic flowchart of a method for a handover between distributed APs according to an embodiment of the present disclosure.
Figure 2B:
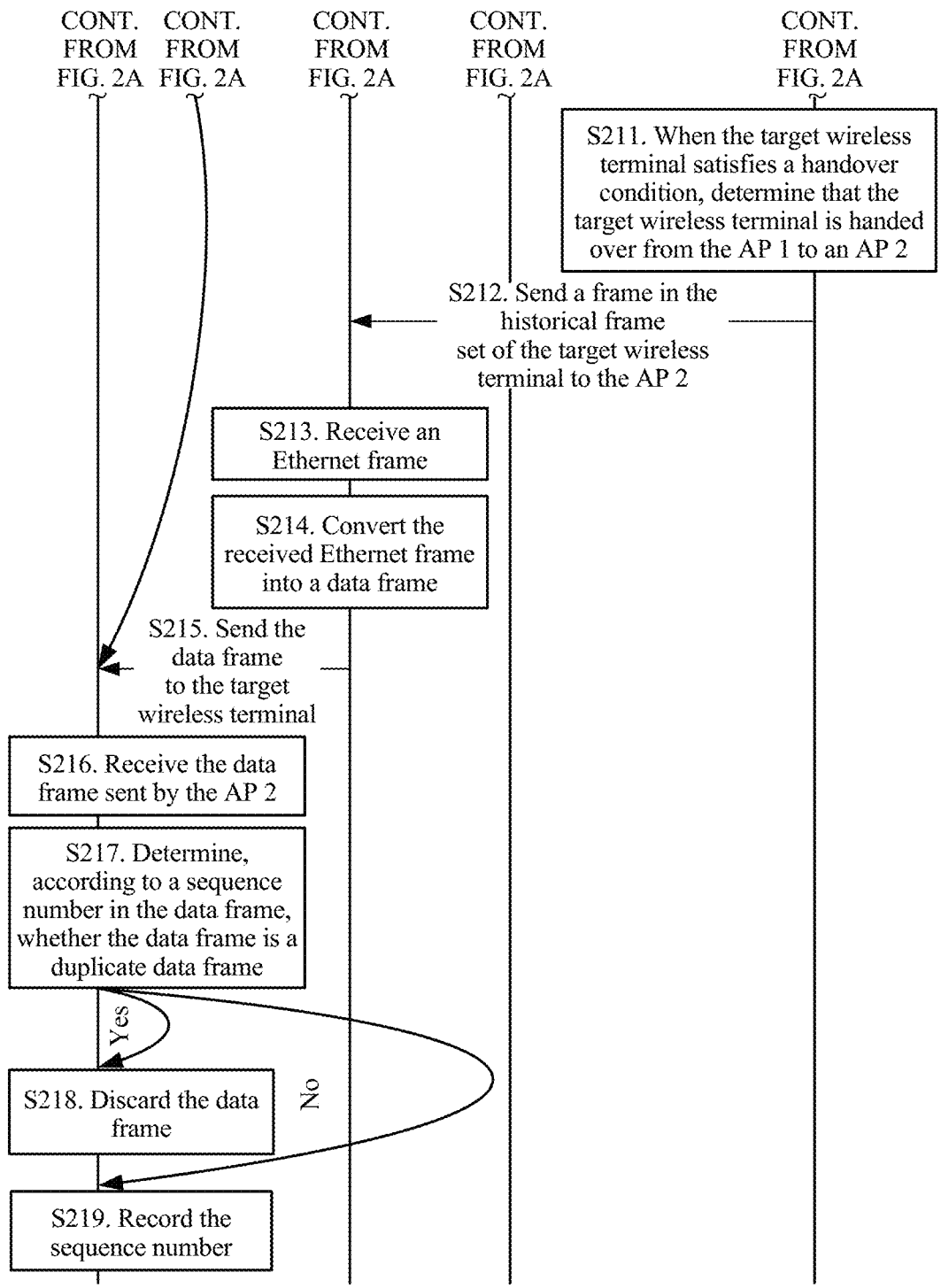

Referring to FIG. 2A to FIG. 2B, FIG. 2A to FIG. 2B are a schematic flowchart of a method for a handover between distributed APs according to an embodiment of the present disclosure. In a coverage area of a distributed AP controlled by a central AP, multiple wireless terminals may be handed over. Handover processes of the wireless terminals between distributed APs are the same. Therefore, in this embodiment of the present disclosure, one of the wireless terminals, that is, a target wireless terminal, is used as an example for description. As shown in FIG. 2A to FIG. 2B, the method includes the following steps.

S201. A central AP receives an Ether net frame.

The central AP may receive an Ether net frame from another wired network device or a distributed AP. A destination address of the Ether net frame is an address of the target wireless terminal, for example, a media access control (MAC) address of the target wireless terminal. The central AP may identify an Ether net frame of the target wireless terminal according to the address of the target wireless terminal.

S202. The central AP adds a first sequence number to the Ether net frame.

The first sequence number is different from a sequence number of a historical frame of the target wireless terminal. The historical frame of the target wireless terminal is a frame that has been sent by the central AP to the target wireless terminal. A sequence number added by the central AP to the Ether net frame is used to indicate a specific sequence number that is added by a distributed AP to a data frame. For example, the sequence number added by the distributed AP to the data frame is the sequence number in the Ether net frame. The sequence number of the data frame is a 12-bit value, and therefore, the sequence number added by the central AP to the Ether net frame may be a 12-bit value. Alternatively, the sequence number added by the central AP to the Ether net frame may be shorter than 12 bits, and the distributed AP adds a fixed padding bit before the sequence number shorter than 12 bits, to obtain the sequence number in the data frame.

The central AP may first determine a sequence number record of the target wireless terminal and then add the first sequence number to the Ether net frame according to the sequence number record. The central AP may record the sequence number record of the target wireless terminal according to the address of the target wireless terminal. Therefore, when searching for the sequence number record of the target wireless terminal, the central AP may use the address of the target wireless terminal as an index, that is, perform indexing according to the destination address of the Ether net frame.

Content recorded in the sequence number record of the target wireless terminal may be either of the following: a sequence number added by the central AP to a latest Ether net frame of the target wireless terminal, where the latest Ether net frame of the target wireless terminal is generally an Ether net frame with a maximum sequence number in Ether net frames of the target wireless terminal; for example, the sequence number added by the central AP to the latest Ether net frame of the target wireless terminal is "A", and the sequence number record of the target wireless terminal recorded by the central AP is "A"; or a next sequence number of a sequence number added by the central AP to a latest Ether net frame of the target wireless terminal; for example, the sequence number added by the central AP to the latest Ether net frame of the target wireless terminal is "A", or if sequence numbers designated by the central AP are consecutive, the sequence number record of the target wireless terminal recorded by the central AP is "A+1"; or if sequence numbers designated by the central AP are not consecutive, the sequence number record of the target wireless terminal recorded by the central AP is "A+M", where M is a value related to a rule for designating a sequence number by the central AP, for example, 2 or 3.

If the content recorded in the sequence number record of the target wireless terminal is the sequence number added by the central AP to the latest Ether net frame of the target wireless terminal, after determining the sequence number record of the target wireless terminal, the central AP obtains the first sequence number according to the sequence number record, where the first sequence number is a next sequence number of an added maximum sequence number; and adds the first sequence number to the Ether net frame. The central AP updates the sequence number record of the target wireless terminal to the first sequence number.

If the content recorded in the sequence number record of the target wireless terminal is the next sequence number of the sequence number added by the central AP to the latest Ether net frame of the target wireless terminal, after determining the sequence number record of the target wireless terminal, the central AP obtains the first sequence number according to the sequence number record, where the first sequence number is a sequence number recorded in the sequence number record; and adds the first sequence number to the Ether net frame. The central AP updates the sequence number record of the target wireless terminal to a next sequence number of the first sequence number.

A location of the first sequence number in the Ether net frame includes either of the following manners.

Manner 1: The first sequence number is in a VLAN ID field of the Ether net frame. The VLAN ID field includes 12 bits. In a central-distributed architecture, a central AP and a distributed AP are directly connected. The distributed AP may be configured to receive all Ether net frames sent by the central AP directly connected to the distributed AP, regardless of a VLAN identifier in an Ether net frame. Therefore, the VLAN ID field may be used to carry the first sequence number of the target wireless terminal.

Manner 2: The central AP encapsulates the Ether net frame into a CAPWAP packet, and the first sequence number may be in a customized field of a CAPWAP header of the CAPWAP packet. If CAPWAP encapsulation is performed on the Ether net frame, a field may be customized in the CAPWAP header, and the customized field carries the first sequence number of the target wireless terminal.

The central AP may also add the first sequence number to another location in the Ether net frame.

S203. The central AP sends, to a first distributed AP, the Ether net frame to which the first sequence number is added.

The first distributed AP (hereinafter referred to as an AP 1) is a distributed AP serving the target wireless terminal before the target wireless terminal is handed over.

S204. The central AP stores the Ether net frame to which the first sequence number is added in a historical frame set of the target wireless terminal.

The central AP may allocate a storage area for storing historical frames of multiple wireless terminals, and distinguish, according to addresses of the wireless terminals, between historical frame sets used by the different wireless terminals to store the historical frames.

When storing the Ether net frame to which the first sequence number is added, the central AP may find the historical frame set of the target wireless terminal according to the address of the target wireless terminal, and store, in a corresponding historical frame set in a particular storage order, the Ether net frame to which the first sequence number is added.

The storage order includes but is not limited to a storage time order, a sequence number order of stored Ether net frames (hereinafter referred to as a storage sequence number order), or a queue order.

Further, if the historical frame set of the target wireless terminal is greater than a preset threshold, the central AP may delete one or more frames from the historical frame set of the target wireless terminal in the storage order. A historical frame set quantity after the deletion is less than or equal to the preset threshold. That the historical frame set is greater than the preset threshold may mean that a quantity of frames stored in the historical frame set is greater than a preset quantity threshold, or that a data volume of frames stored in the historical frame set is greater than a preset capacity threshold.

If storage time order is used as the storage order for storage, the central AP may sequentially delete one or more frames from the historical frame set of the target wireless terminal in storage time order.

If the storage sequence number order is used as the storage order for storage, and the storage sequence number order is ascending order in which sequence numbers are added, the central AP may delete one or more frames from the historical frame set of the target wireless terminal in the ascending order of the sequence numbers.

If the storage sequence number order is used as the storage order for storage, and the storage sequence number order is descending order in which sequence numbers are added, the central AP may delete one or more frames from the historical frame set of the target wireless terminal in descending order of the sequence numbers.

If queue order is used as the storage order for storage, the central AP may delete one or more frames from the historical frame set of the target wireless terminal in first-in first-out order.

There is no strict order between S203 and S204, and they may be performed at the same time.

S205. The AP 1 receives the Ether net frame that is sent by the central AP and to which the first sequence number is added.

S206. The AP 1 converts the Ether net frame to which the first sequence number is added into a data frame. The data frame carries a second sequence number. The first sequence number is a sequence number added by the central AP to the Ether net frame, and the second sequence number is a sequence number that is generated by the distributed AP based on the first sequence number.

The data frame refers to a service data unit (MSDU) or an aggregate MSDU (A-MSDU) in a WLAN. The MSDU and the A-MSDU each include a sequence control field with a length of 16 bits. The sequence control field includes a 12-bit sequence number (SN) field.

If the data frame is an MSDU, the AP 1 converts an Ether net frame into the MSDU, and a sequence number (that is, the second sequence number) of the MSDU is not designated by the AP 1, but is generated based on the first sequence number. For example, the second sequence number may be the same as the first sequence number, or may be a value obtained after a fixed value is added to the first sequence number.

If the data frame is an A-MSDU, the AP 1 may convert at least two Ether net frames into the A-MSDU, and each Ether net frame is converted into an A-MSDU subframe in the A-MSDU. A sequence number (that is, the second sequence number) of the A-MSDU is not designated by the AP 1, but is generated based on the first sequence number. For example, the second sequence number may be the same as the first sequence number, or may be a sequence number of any Ether net frame of the at least two Ether net frames. It is assumed that the AP 1 converts three Ether net frames into the A-MSDU: a first Ether net frame, a second Ether net frame, and a third Ether net frame, a sequence number carried in the first Ether net frame is "A", a sequence number of the second Ether net frame is "A+1", and a sequence number of the third Ether net frame is "A+2". If sequence numbers designated by the central AP are consecutive, the second sequence number is "A". If sequence numbers designated by the central AP are not consecutive, the second sequence number may be any one of sequence numbers "A", "A+1", or "A+2".

S207. The AP 1 sends the data frame to the target wireless terminal.

A processing process performed by the target wireless terminal after the target wireless terminal receives the data frame sent by the AP 1 is the same as a processing process performed by the target wireless terminal after the target wireless terminal receives a data frame sent by an AP 2. Refer to related descriptions in the following S216 to S219.

S208. Optionally, the AP 1 sends a sequence number change message to the central AP.

If the AP 1 converts at least two Ether net frames into an A-MSDU, and sequence numbers designated by the central AP are consecutive, to ensure as much as possible that sequence numbers of data frames received by the wireless terminal are consecutive, the AP 1 may send the sequence number change message to the central AP. The at least two Ether net frames include a first Ether net frame and a second Ether net frame. The first Ether net frame carries the first sequence number, and the second Ether net frame carries a third sequence number. The first Ether net frame is an Ether net frame with a minimum sequence number in the at least two Ether net frames. The second Ether net frame is an Ether net frame with a maximum sequence number in the at least two Ether net frames. The sequence number change message includes the address of the target wireless terminal and a sequence number change value based on the first sequence number and the third sequence number. That is, the AP 1 may use a difference between the third sequence number and the first sequence number as the sequence number change value and send the sequence number change value to the central AP; or the AP 1 may directly use the first sequence number and the third sequence number as the sequence number change value and send the sequence number change value to the central AP.

It should be noted that there is no strict order for performing S207 and S208, and they may be performed at the same time.

S209. Optionally, the central AP receives the sequence number change message sent by the AP 1.

If the AP 1 sends the sequence number change message, the central AP may receive the sequence number change message. If the central AP does not receive the sequence number change message, S210 is omitted.

S210. Optionally, the central AP modifies a sequence number record of the target wireless terminal according to the sequence number change message.

If the sequence number change value in the sequence number change message is a difference, the central AP uses a result obtained by subtracting the difference from the recorded sequence number record as the modified sequence number record. For example, the sequence number record is "1003", the sequence number change value in the sequence number change message is "2", and therefore, the modified sequence number record is "1001".

If the sequence number change value in the sequence number change message is two sequence numbers, the central AP performs subtraction on the two sequence numbers, and uses a result obtained by subtracting a result of the subtraction from the recorded sequence number record as the modified sequence number record. It is assumed that the sequence number record is "1003", sequence number change values in the sequence number change message are "1000" and "1002". The modified sequence number record is "1003−(1002−1000)=1001".

S211. When the target wireless terminal satisfies a handover condition, the central AP determines that the target wireless terminal is handed over from the AP 1 to a second distributed AP. The second distributed AP (hereinafter referred to as an AP 2) is a distributed AP with which the target wireless terminal is associated after the target wireless terminal is handed over.

Figure 3:
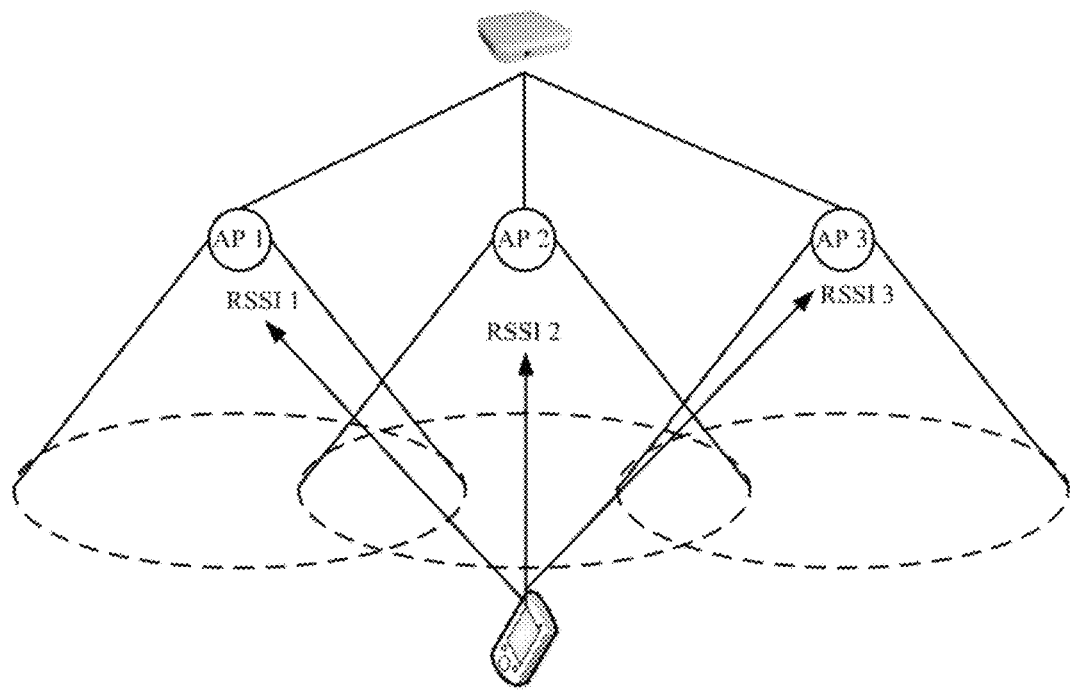
FIG. 3 is a schematic diagram of a handover scenario according to an embodiment of the present disclosure.

Optionally, the central AP may determine in real time whether the target wireless terminal satisfies the handover condition. As shown in FIG. 3, after the target wireless terminal is connected to a network, both a currently serving distributed AP (for example, an AP 2 in FIG. 3) and its neighboring distributed APs (for example, an AP 1 and an AP 3 in FIG. 3) periodically report receive signal strength indicators (RSSIs) of the target wireless terminal to the central AP. The central AP determines, based on the RSSIs of the target wireless terminal that are monitored by the distributed APs, whether the handover condition is satisfied. If the handover condition is satisfied, the central AP determines that the target wireless terminal is handed over from the AP 1 to the AP 2.

In some embodiments, the central AP compares an RSSI sent by the distributed AP currently serving the target wireless terminal with RSSIs sent by its neighboring distributed APs separately. If a difference between a strength of the RSSI sent by the neighboring distributed AP and a strength of the RSSI sent by the currently serving distributed AP reaches a specific threshold, and in a subsequent period of time, the strength of the RSSI sent by the neighboring distributed AP becomes increasingly high, but the strength of the RSSI sent by the currently serving distributed AP becomes increasingly low, the central AP determines that the handover condition is satisfied. As shown in FIG. 3, it is assumed that an RSSI sent by the AP 2 is an RSSI 2, an RSSI sent by the AP 1 is an RSSI 1, and an RSSI sent by the AP 3 is an RSSI 3. If a difference obtained by subtracting the RSSI 2 from the RSSI 3 reaches a specific threshold, and in a subsequent period of time, a strength of the RRIS 3 becomes increasingly high, but a strength of the RSSI 2 becomes increasingly low, the central AP determines that the handover condition is satisfied.

The handover condition may further be another combination that can be used for a handover decision, for example, the strength of the RSSI sent by the neighboring distributed AP exceeds a specific threshold, and the strength of the RSSI sent by the distributed AP currently serving the target wireless terminal is less than a specific threshold.

Optionally, another device, for example, the target wireless terminal or a distributed AP may also determine in real time whether the target wireless terminal satisfies the handover condition. The device sends a handover notification message to the central AP when the handover condition is satisfied, so as to trigger the central AP to perform S211.

S212. The central AP sends a frame in the historical frame set of the target wireless terminal to the AP 2.

S213. The AP 2 receives an Ether net frame sent by the central AP.

S214. The AP 2 converts the received Ether net frame into a data frame.

A processing process performed by the AP 2 after the AP 2 receives the Ether net frame sent by the central AP is similar to the processing process performed by the AP 1 after the AP 1 receives the Ether net frame sent by the central AP. Refer to the foregoing related descriptions.

S215. The AP 2 sends the data frame to the target wireless terminal.

S216. The target wireless terminal receives the data frame sent by the AP 2.

If the target wireless terminal does not receive the data frame sent by the AP 2, this step is omitted.

After receiving data frames sent by distributed APs, the target wireless terminal needs to perform a processing process in S217 to S219 on all the data frames. For ease of description, in this embodiment of the present disclosure, a processing process for only one of the data frames is described, but this is not construed as a limitation to the present disclosure.

S217. The target wireless terminal determines, according to a sequence number in the data frame, whether the data frame is a duplicate data frame.

During a process of handing over the target wireless terminal from the AP 1 to the AP 2, the AP 1 sends some packets to the target wireless terminal, and the other packets may be buffered because they have not been sent to the target wireless terminal. After the target wireless terminal is handed over to the AP 2, the AP 2 sends the frame in the historical frame set of the target wireless terminal to the target wireless terminal. If the data frame received by the target wireless terminal is a data frame that has been sent by the AP 1, the target wireless terminal determines that the data frame is a duplicate data frame, and S218 is performed; otherwise, S219 is performed.

A manner of recording a sequence number by the target wireless terminal includes either of the following manners.

Manner 1: The target wireless terminal records a maximum sequence number.

Manner 2: The target wireless terminal records sequence numbers of multiple data frames.

The target wireless terminal may record sequence numbers of all data frames received in a recent period of time, for example, the last 30 minutes, one hour, or two hours. That is, the target wireless terminal may require that sequence numbers of all data frames received within a period of time should be recorded. The target wireless terminal may also preset a quantity of to-be-recorded sequence numbers. It is assumed that the preset quantity of to-be-recorded sequence numbers is M. If a quantity of sequence numbers to be recorded by the target wireless terminal is M, when a sequence number needs to be recorded, the target wireless terminal deletes a sequence number that is recorded earliest.

If the target wireless terminal records a sequence number in Manner 1, after receiving the data frame, the target wireless terminal extracts the sequence number from the data frame, and determines whether the sequence number is less than or equal to the recorded maximum sequence number. If yes, the target wireless terminal determines that the data frame is a duplicate Ether net frame.

If the target wireless terminal records a sequence number in Manner 2, after receiving the data frame, the target wireless terminal extracts the sequence number from the data frame, and determines whether a sequence number in the recorded sequence numbers of the multiple data frames is the same as the sequence number extracted from the received data frame. If a sequence number in the recorded sequence numbers is the same as the sequence number in the received data frame, the target wireless terminal determines that the data frame is a duplicate Ether net frame.

S218. The target wireless terminal discards the data frame.

S219. The target wireless terminal records the sequence number.

For a method for recording a sequence number by the target wireless terminal, refer to the description in S217. For another processing performed by the target wireless terminal after the target wireless terminal determines that the received data frame is not a duplicate data frame, refer to the prior art.

In the embodiment shown in FIG. 2A to FIG. 2B, a central AP sets a historical frame set for a target wireless terminal, and stores an Ether net frame sent to a first distributed AP in the historical frame set. If the wireless terminal moves fast, the central AP may send a frame in the historical frame set to the wireless terminal using a second distributed AP, to replace a frame that is buffered in the first distributed AP and has not been sent to the wireless terminal, so that a downlink packet loss during a handover of the wireless terminal between the first distributed AP and the second distributed AP is reduced.

Figure 4:
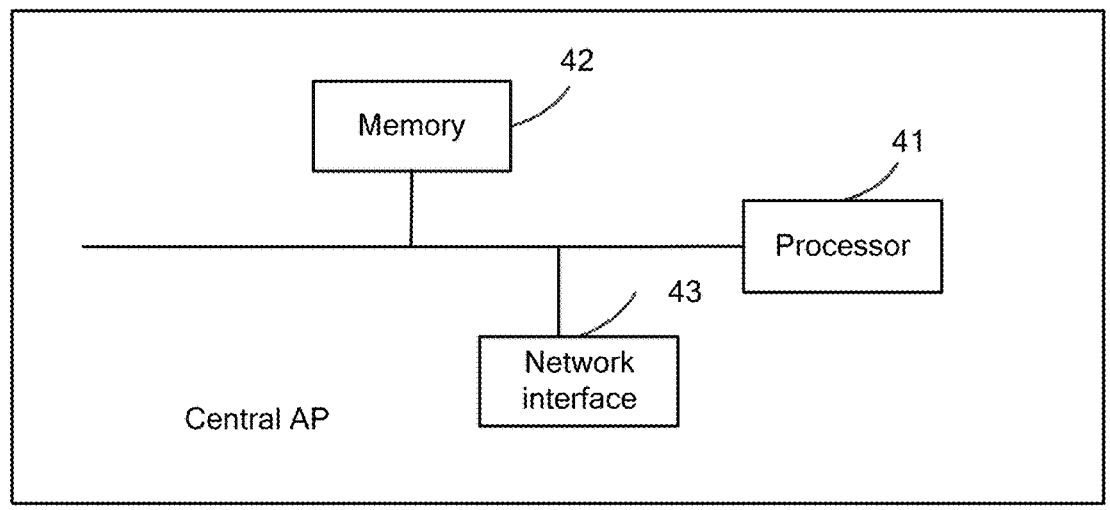
FIG. 4 is a schematic structural diagram of a central AP according to an embodiment of the present disclosure.

Referring to FIG. 4, FIG. 4 is a schematic structural diagram of a central AP according to an embodiment of the present disclosure. As shown in FIG. 4, the central AP includes a processor 41, a memory 42, and a network interface 43. The processor 41 is connected to the memory 42 and the network interface 43. For example, the processor 41 may be connected to the memory 42 and the network interface 43 using a bus.

The processor 41 is configured to support the central AP in performing corresponding functions in the foregoing method. The processor 41 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 42 is configured to store a handover condition, a sequence number of a wireless terminal, and the like. The memory 42 may include a volatile memory, for example, a random-access memory (RAM). Alternatively, the memory 42 may include a non-volatile memory, for example, a read-only memory (ROM), a flash memory, a hard disk drive (HDD), or a solid-state drive (SSD). Alternatively, the memory 42 may include a combination of the foregoing types of memories.

The network interface 43 includes one or more Ether net interfaces. If the network interface 43 includes one Ether net interface, the central AP may be connected to a piece of switching equipment using the Ether net interface. One or more network interfaces of the switching equipment are connected to a distributed AP in a wired manner, and are configured to send/receive messages involved in the foregoing methods to/from the distributed AP. Remaining network interfaces of the switching equipment are connected to another network device in a wired manner, and are configured to receive an Ether net frame sent by the another network device. If the network interface 43 includes multiple Ether net interfaces, one or more Ether net interfaces of the multiple Ether net interfaces are connected to the distributed AP in a wired manner, and are configured to send/receive messages involved in the foregoing methods to/from the distributed AP. Remaining Ether net interfaces of the multiple Ether net interfaces are connected to another network device in a wired manner, and are configured to receive an Ether net frame sent by the another network device.

The processor 41 may perform the following operations: receiving an Ether net frame using the network interface 43, where a destination address of the Ether net frame is an address of a wireless terminal; adding a sequence number to the Ether net frame according to the address of the wireless terminal, where the sequence number is different from a sequence number of a historical frame of the wireless terminal, and the historical frame of the wireless terminal is a frame that has been sent by the central AP to the wireless terminal; sending, to a first distributed AP using the network interface 43, the Ether net frame to which the sequence number is added, where the first distributed AP is a distributed AP serving the wireless terminal among multiple distributed APs; and storing the Ether net frame to which the sequence number is added in a historical frame set of the wireless terminal; and sending, using the network interface 43, a frame in the historical frame set of the wireless terminal to a second distributed AP when the wireless terminal is handed over from the first distributed AP to the second distributed AP.

Further, when the historical frame set is greater than a preset threshold, the processor 41 deletes one or more frames from the historical frame set in storage order. The historical frame set after the deletion is less than or equal to the preset threshold.

Further, the sequence number is added to a virtual local area network identifier field of the Ether net frame.

Further, the processor 41 may further encapsulate the Ether net frame into a CAPWAP packet, and add the sequence number to a customized field of a CAPWAP header of the CAPWAP packet.

Further, that the processor 41 adds a sequence number to the Ether net frame according to the address of the wireless terminal may comprise determining a sequence number record of the wireless terminal according to the address of the wireless terminal, and adding the sequence number to the Ether net frame according to the sequence number record.

Further, the processor 41 may further receive, using the network interface 43, a sequence number change message sent by the first distributed AP, where the sequence number change message includes the address of the wireless terminal and a sequence number change value; and determine the sequence number record of the wireless terminal according to the address of the wireless terminal, and modify the sequence number record of the wireless terminal according to the sequence number change value.

Figure 5:
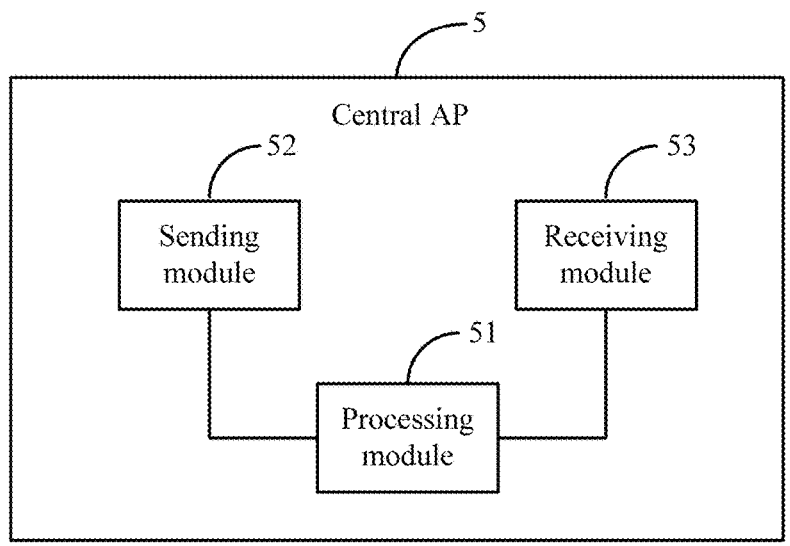
FIG. 5 is a schematic structural diagram of another central AP according to an embodiment of the present disclosure.

Referring to FIG. 5, FIG. 5 is a schematic structural diagram of another central AP 5 according to an embodiment of the present disclosure. As shown in FIG. 5, the central AP includes a processing module 51, a sending module 52, and a receiving module 53. The processing module 51 implements functions of the processor shown in FIG. 4. The sending module 52 implements functions of the network interface shown in FIG. 4 together with the receiving module 53.

Figure 6:
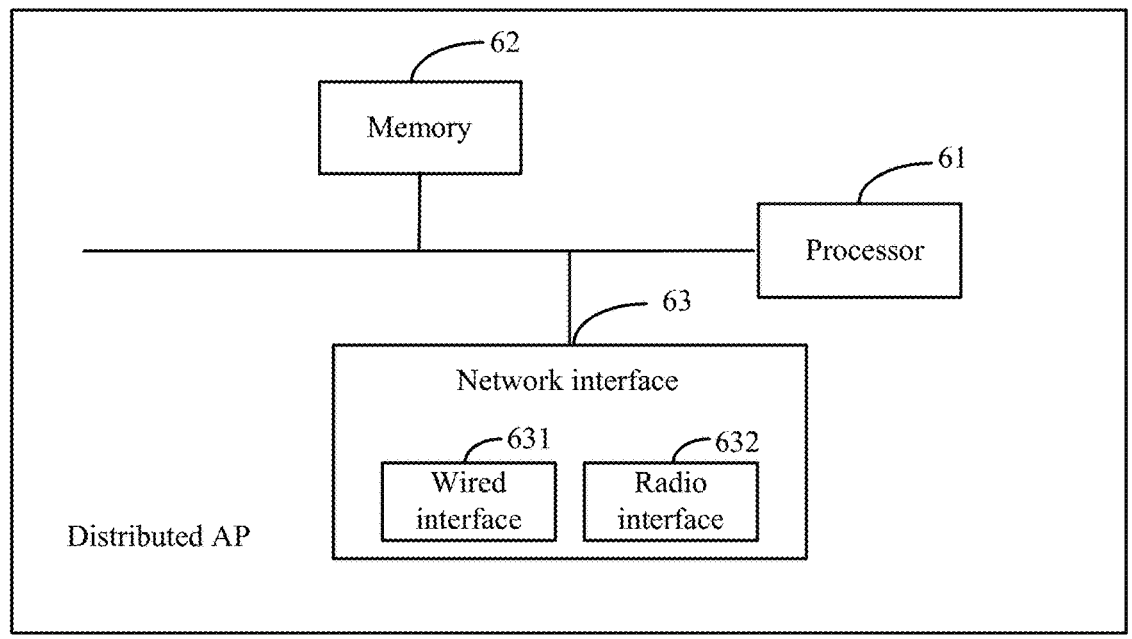
FIG. 6 is a schematic structural diagram of a distributed AP according to an embodiment of the present disclosure.

Referring to FIG. 6, FIG. 6 is a schematic structural diagram of a distributed AP according to an embodiment of the present disclosure. As shown in FIG. 6, the distributed AP includes a processor 61, a memory 62, and a network interface 63. The processor 61 is connected to the memory 62 and the network interface 63. For example, the processor 61 may be connected to the memory 62 and the network interface 63 using a bus.

The processor 61 is configured to perform corresponding functions in the foregoing method as a distributed AP. The processor 61 may be a CPU, an NP, a hardware chip, a radio frequency (RF) chip, a baseband chip, or any combination thereof. The hardware chip may be an ASIC, a PLD, or a combination thereof. The PLD may be a CPLD, an FPGA, a GAL, or any combination thereof.

The network interface 63 includes a radio interface 632. Optionally, the network interface 63 may further include a wired interface 631. The distributed AP may be connected to a central AP in a wired manner using the wired interface 631, and send/receive messages involved in the foregoing methods to/from the central AP. Alternatively, the distributed AP may be connected to the central AP using the radio interface 632, and send/receive messages involved in the foregoing methods to/from the central AP. The distributed AP performs wireless communication with a wireless terminal using the radio interface 632. The radio interface 632 includes an antenna. The memory 62 may include a volatile memory, for example, a RAM. Alternatively, the memory 62 may include a non-volatile memory, for example, a ROM, a flash memory, an HDD, or an SSD. Alternatively, the memory 62 may include a combination of the foregoing types of memories.

The processor 61 may perform the following operations: receiving, using the network interface 63, a first Ether net frame sent by the central AP, where a destination address of the first Ether net frame is an address of the wireless terminal, and the first Ether net frame carries a first sequence number; converting the first Ether net frame into a data frame, where a sequence number of the data frame is a second sequence number generated based on the first sequence number; and sending the data frame to the wireless terminal using the network interface 63.

Further, that the processor 61 converts the first Ether net frame into a data frame may comprise combining at least two Ether net frames sent by the central AP into one data frame. The at least two Ether net frames include the first Ether net frame, and a destination address of each Ether net frame of the at least two Ether net frames is the address of the wireless terminal.

Still further, the at least two Ether net frames further include a second Ether net frame. The second Ether net frame carries a third sequence number. The first Ether net frame is an Ether net frame with a minimum sequence number in the at least two Ether net frames. The second Ether net frame is an Ether net frame with a maximum sequence number in the at least two Ether net frames. The processor 61 may further send a sequence number change message to the central AP using the network interface 63. The sequence number change message includes the address of the wireless terminal and a sequence number change value, and the sequence number change value includes a value that is obtained according to the first sequence number and the third sequence number.

Figure 7:
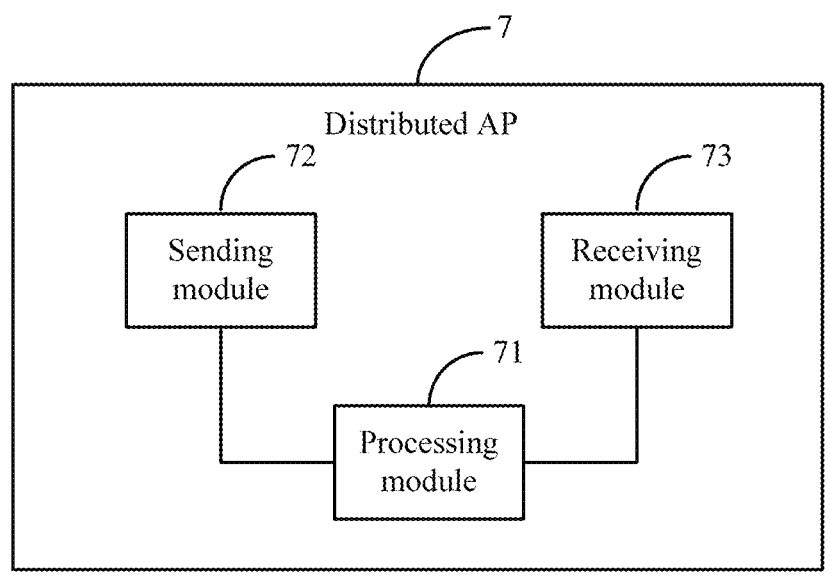
FIG. 7 is a schematic structural diagram of another distributed AP according to an embodiment of the present disclosure.

Referring to FIG. 7, FIG. 7 is a schematic structural diagram of another distributed AP according to an embodiment of the present disclosure. As shown in FIG. 7, the distributed AP 7 includes a processing module 71, a sending module 72, and a receiving module 73. The processing module 71 implements functions of the processor shown in FIG. 6. The sending module 72 implements functions of a sending interface of a network interface 63. The receiving module 73 implements functions of a receiving interface of the network interface 63.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a ROM or RAM, or the like.

What are disclosed above are merely examples of embodiments of the present disclosure, and certainly are not intended to limit the protection scope of the present disclosure. Therefore, the protection scope of the present disclosure shall be subject to the protection scope of the claims.

What is claimed is:

1. A method for a handover between distributed access points, comprising:
receiving, by a network interface of a central access point (AP), an Ethernet frame, wherein a destination address of the Ethernet frame is an address of a wireless terminal;
adding, by the central AP, a sequence number to the Ethernet frame according to the address of the wireless terminal, wherein the sequence number is different from a sequence number of a historical frame of the wireless terminal, and wherein the historical frame of the wireless terminal is a frame that has been sent by the central AP to the wireless terminal;

sending, by the central AP to a first distributed AP, the Ethernet frame to which the sequence number is added, wherein the first distributed AP is a distributed AP serving the wireless terminal among multiple distributed APs;

storing the Ethernet frame to which the sequence number is added in a historical frame set of the wireless terminal;

determining the wireless terminal is handed over from the first distributed AP to a second distributed AP; and sending, by the network interface of the central AP, a frame in the historical frame set of the wireless terminal to the second distributed AP in response to the wireless terminal being handed over from the first distributed AP to the second distributed AP.

2. The method according to claim 1, wherein the sequence number is added to a virtual local area network identifier field of the Ethernet frame.

3. The method according to claim 1, wherein adding, by the central AP, the sequence number to the Ethernet frame according to the address of the wireless terminal comprises:

determining, by the central AP, a sequence number record of the wireless terminal according to the address of the wireless terminal; and adding the sequence number to the Ethernet frame according to the sequence number record, and wherein the method further comprises:

receiving, by the central AP, a sequence number change message from the first distributed AP, wherein the sequence number change message comprises the address of the wireless terminal and a sequence number change value;

determining, by the central AP, the sequence number record of the wireless terminal according to the address of the wireless terminal; and modifying the sequence number record of the wireless terminal according to the sequence number change value.

4. A method for a handover between distributed access points, comprising:

receiving, by a distributed access point (AP), a first Ethernet frame from a central AP, wherein a destination address of the first Ethernet frame is an address of a wireless terminal, and wherein the first Ethernet frame carries a first sequence number;

converting, by the distributed AP, the first Ethernet frame into a data frame by combining, by the distributed AP, at least two Ethernet frames received from the central AP into the data frame, wherein a sequence number of the data frame is a second sequence number generated based on the first sequence number, wherein the at least two Ethernet frames comprise the first Ethernet frame, and wherein a destination address of each Ethernet frame of the at least two Ethernet frames is the address of the wireless terminal; and sending, by the distributed AP, the data frame to the wireless terminal.

5. The method according to claim 4, wherein the at least two Ethernet frames further comprise a second Ethernet frame, wherein the second Ethernet frame carries a third sequence number, wherein the first Ethernet frame is an Ethernet frame with a minimum sequence number in the at least two Ethernet frames, wherein the second Ethernet frame is an Ethernet frame with a maximum sequence number in the at least two Ethernet frames, wherein the method further comprises sending, by the distributed AP, a sequence number change message to the central AP, and wherein the sequence number change message comprises the address of the wireless terminal and a sequence number change value based on the first sequence number and the third sequence number.

6. A central access point (AP), comprising:

a memory;

a network interface; and a processor coupled to the memory and the network interface, wherein the processor is configured to:

receive an Ethernet frame using the network interface, wherein a destination address of the Ethernet frame is an address of a wireless terminal;

add a sequence number to the Ethernet frame according to the address of the wireless terminal, wherein the sequence number is different from a sequence number of a historical frame of the wireless terminal, and wherein the historical frame of the wireless terminal is a frame that has been received from the central AP to the wireless terminal;

send, to a first distributed AP, the Ethernet frame to which the sequence number is added, wherein the first distributed AP is a distributed AP serving the wireless terminal among multiple distributed APs;

store the Ethernet frame to which the sequence number is added in a historical frame set of the wireless terminal; and send, using the network interface, a frame in the historical frame set of the wireless terminal to a second distributed AP when the wireless terminal is handed over from the first distributed AP to the second distributed AP, wherein the memory is configured to store the historical frame set.

7. The central AP according to claim 6, wherein the sequence number is added to a virtual local area network identifier field of the Ethernet frame.

8. The central AP according to claim 6, wherein the processor is further configured to:

determine a sequence number record of the wireless terminal according to the address of the wireless terminal;

add the sequence number to the Ethernet frame according to the sequence number record;

receive, using the network interface, a sequence number change message from the first distributed AP, wherein the sequence number change message comprises the address of the wireless terminal and a sequence number change value;

determine the sequence number record of the wireless terminal according to the address of the wireless terminal; and modify the sequence number record of the wireless terminal according to the sequence number change value.

9. A distributed access point (AP), comprising:

a network interface; and a processor coupled to the network interface, wherein the processor is configured to:

receive, using the network interface, a first Ethernet frame from a central AP, wherein a destination address of the first Ethernet frame is an address of a wireless terminal, and wherein the first Ethernet frame carries a first sequence number;

convert the first Ethernet frame into a data frame by combining at least two Ethernet frames received from the central AP into the data frame, wherein a sequence number of the data frame is a second sequence number generated based on the first sequence number, wherein the at least two Ethernet frames comprise the first Ethernet frame, and wherein a destination address of each Ethernet frame of the at least two Ethernet frames is the address of the wireless terminal; and send the data frame to the wireless terminal using the network interface.

10. The distributed AP according to claim 9, wherein the at least two Ethernet frames further comprise a second Ethernet frame, wherein the second Ethernet frame carries a third sequence number, wherein the first Ethernet frame is an Ethernet frame with a minimum sequence number in the at least two Ethernet frames, wherein the second Ethernet frame is an Ethernet frame with a maximum sequence number in the at least two Ethernet frames, wherein the processor is further configured to send a sequence number change message to the central AP using the network interface, and wherein the sequence number change message comprises the address of the wireless terminal and a sequence number change value based on the first sequence number and the third sequence number.

* * * * *